United States Patent
Lunadier

(10) Patent No.: US 8,516,167 B2
(45) Date of Patent: Aug. 20, 2013

(54) MICROCONTROLLER SYSTEM BUS SCHEDULING FOR MULTIPORT SLAVE MODULES

(75) Inventor: Franck Lunadier, Trets (FR)

(73) Assignee: Atmel Corporation, San Jose, CA (US)

( * ) Notice: Subject to any disclaimer, the term of this patent is extended or adjusted under 35 U.S.C. 154(b) by 195 days.

(21) Appl. No.: 13/197,547

(22) Filed: Aug. 3, 2011

(65) Prior Publication Data

US 2013/0036246 A1 Feb. 7, 2013

(51) Int. Cl.
*G06F 13/00* (2006.01)

(52) U.S. Cl.
USPC .............. 710/35; 710/110; 710/240; 710/313

(58) Field of Classification Search
USPC .................. 710/35, 110, 113, 240, 241, 244, 710/305, 313, 316
See application file for complete search history.

(56) References Cited

U.S. PATENT DOCUMENTS

| | | | |
|---|---|---|---|
| 2006/0090024 A1* | 4/2006 | Tanabe | 710/110 |
| 2008/0288688 A1* | 11/2008 | Kang et al. | 710/110 |
| 2010/0318691 A1* | 12/2010 | Kitagawa | 710/35 |

OTHER PUBLICATIONS

AMBA® Network Interconnect Advanced Quality of Service (QoS-301) Technical Reference Manual; Copyright 2010; 50 pages.
AMBA™ Specification (Rev 2.0); Copyright 1999; 230 pages.
AMBA™ 3 APB Protocol v1.0 Specification; Copyright 2003, 2004; 34 pages.

* cited by examiner

*Primary Examiner* — Glenn A Auve
(74) *Attorney, Agent, or Firm* — Fish & Richardson P.C.

(57) ABSTRACT

A system includes master modules, at least one multiport slave module, and a scheduler connected by a system bus. The scheduler is configured to provide scheduling information to the multiport slave module. The scheduling information includes master categorization information and anticipated burst information. The anticipated burst information is based on a scheduler determination for an anticipated bus access by an anticipated master module. The master categorization information categorizes the anticipated master.

20 Claims, 8 Drawing Sheets

MICROCONTROLLER SYSTEM BUS SCHEDULING FOR MULTIPORT SLAVE MODULES

TECHNICAL FIELD

This subject matter is generally related to electronics, and more particularly to communication buses for microcontrollers.

BACKGROUND

Microcontrollers can include various modules (e.g., a processor, a memory controller, a display controller, and so on) that communicate with each other using a system bus. A master module initiates bus accesses—read and write operations—on the bus, e.g., by providing address and control information. A slave module responds to read or write operations from master modules. A decoder selects a particular slave module corresponding to an address provided by a master module. In general, only one master module communicates on the bus at any given time. An arbiter manages bus accesses to ensure that only one master module is using the bus. An arbiter can use any of various arbitration schemes (e.g., round robin, time division multiple access (TDMA), and so on.)

SUMMARY

A system bus scheduler for a system bus provides scheduling information to a multiport slave module on the system bus. The scheduling information can include master categorization information and anticipated burst information. The multiport slave module uses the scheduling information to arbitrate between its own ports. For example, the multiport slave module can use the scheduling information to recover from a burst break. This is useful where, for example, the multiport slave module is a pipelined multiport memory module and a burst break can cause inefficiencies.

Particular embodiments of the invention can be implemented to realize one or more of the following advantages: (1) a system bus scheduler and multiport slave arbiter can efficiently meet bandwidth and latency constraints of bus masters while preserving internal multiport slave optimizations; (2) scheduling information allows anticipated burst tracking and efficient burst breaks and recoveries; and (3) scheduling information allows a multiport slave module to anticipate the launching of appropriate commands, avoid command and data cancellation, and maximize latency hiding and data routing to available outputs.

DETAILED DESCRIPTION

System Overview

Figure 1:
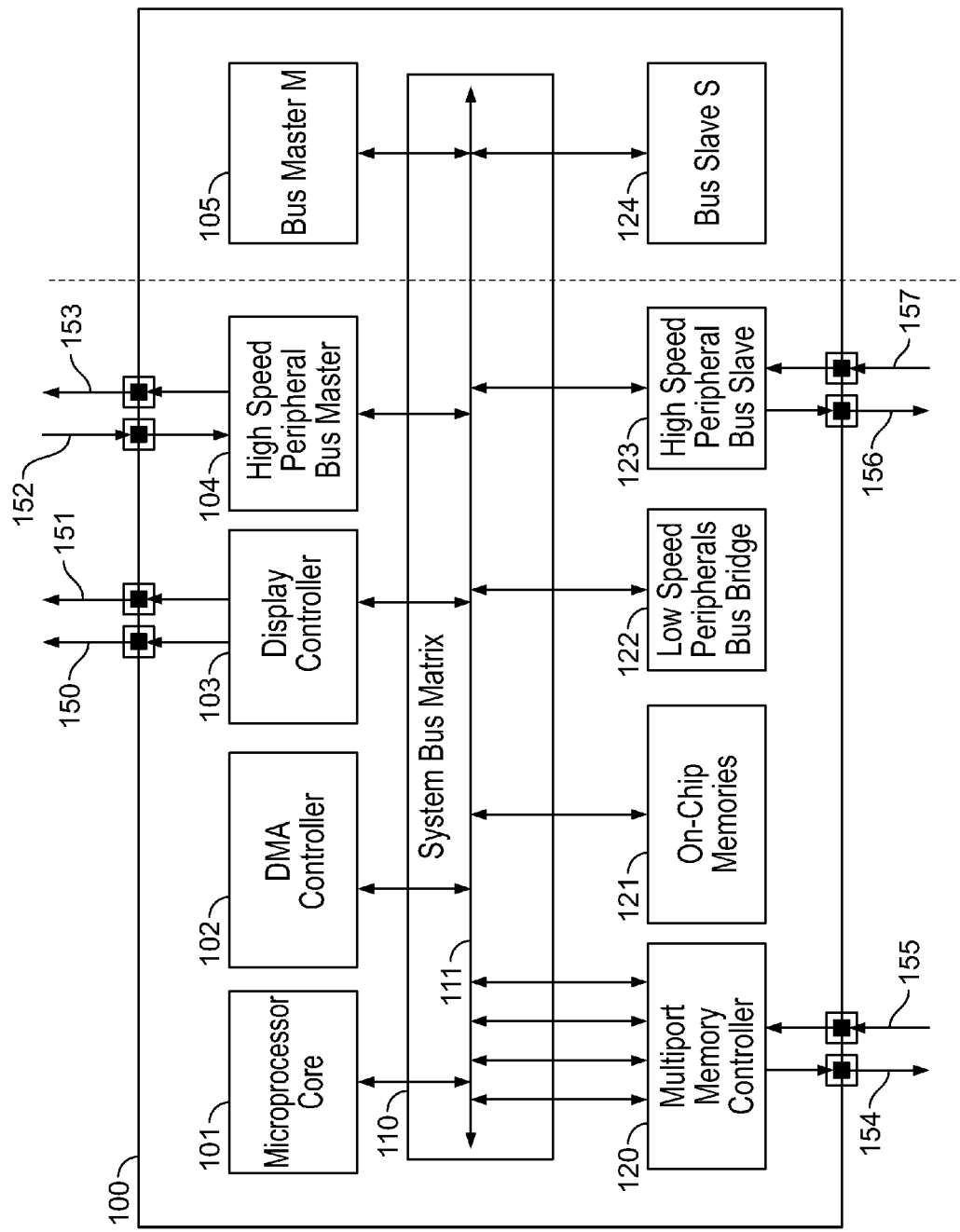
FIG. 1 is a block diagram of an example microcontroller.

FIG. 1 is a block diagram of an example microcontroller 100. The microcontroller 100 includes one or more master modules 101-105, up to a total of M modules. The master modules include a microprocessor 101, a Direct Memory Access (DMA) controller, a display controller 103, and a high speed peripheral bus master 104. The microcontroller 100 also includes one or more slave modules 120-124, up to a total of S slave modules. The slave modules include a multiport slave module (e.g., a memory controller) 120, on-chip memories 121, a low speed peripherals bus bridge 122, and a high speed peripheral bus slave 123. The modules communicate with each other using a system bus matrix 111.

The modules can be connected to devices outside the microcontroller by pads 150-157. For example, the display controller 103 can be connected to a display by pads 150 and 151, the high speed peripheral bus master can be connected to a high speed peripheral bus by pads 152 and 153, the multiport memory controller 120 can be connected to a memory device by pads 154 and 155, and the high speed peripheral bus slave 123 can be connected to a high speed peripheral bus by pads 156 and 157.

The multiport slave module 120 uses scheduling information to arbitrate between its ports. The scheduling information can include master categorization information and anticipated burst information.

The modules shown are examples, and any of various types of master and slave modules can be included in the microcontroller 100. The microcontroller 100 can include one or more master modules and one or more slave modules, and at least one slave module is a multiport slave module.

Example System Bus Matrix

Figure 2:
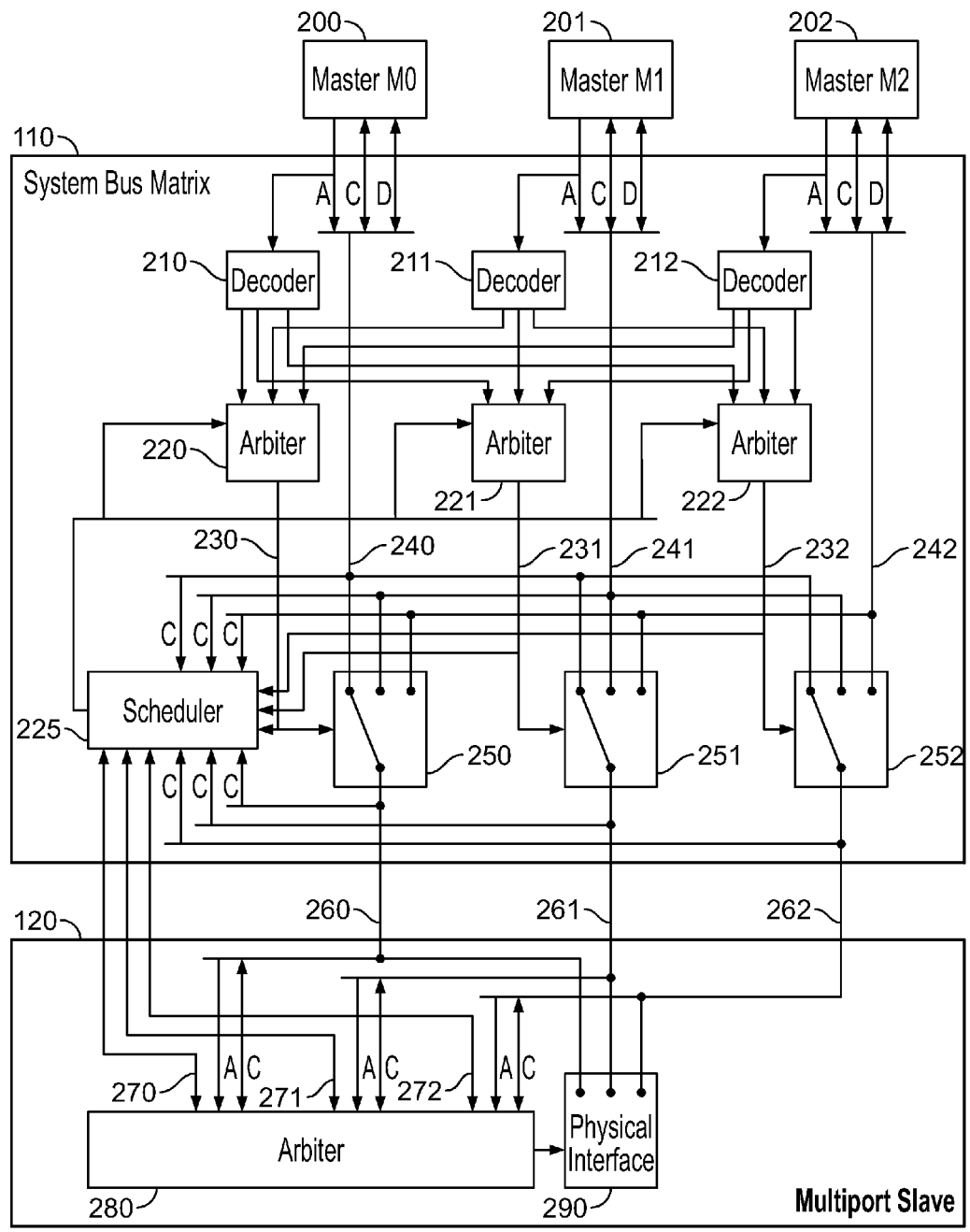
FIG. 2 is a schematic diagram showing an example system bus matrix.

FIG. 2 is a schematic diagram showing an example system bus matrix 110. Three example master modules 200-202 communicate using the system bus matrix 110. One example multiport slave module 120 communicates using the system bus matrix 110. The multiport slave module 120 can be, for example, a multiport memory module.

A bus layer is a connection configured to carry address "A", control "C", and data "D" information. The data signals can be bidirectional. The multiport slave module 120 is illustrated with three slave bus layers 260-262. The multiport slave module 120 can have more or fewer layers. The master modules 200-202 are illustrated with three bus master layers 240-242, one for each master module.

The system bus matrix 110 dynamically routes the bus master layers 240-242 to the bus slave layers 260-262. The system bus matrix 110 can route layers using the address and control signals provided by the master modules 200-202. The control signals can indicate, implicitly or explicitly, various transfer characteristics, e.g., the data direction; the number of bytes per each data bus cycle; the type and length of transfer bursts; type, protection and security attributes of data; requestor identify; slave availability; and other conventional bus transfer characteristic information.

Any of the master modules 200-202 can initiate a bus access using particular combinations of address and control information. A corresponding decoder (one of decoders 210-212) decodes the address information to select one of the slave bus layers 260-262. Then, a corresponding system bus arbiter (one of system bus arbiters 220-222) determines a winning master module using an arbitration scheme. Then, the system bus matrix 110 connects the bus master layer of the winning master module to the targeted bus slave layer of the winning master module. The system bus matrix 110 connects the layers by driving the switch selectors 230-232 to toggle the matrix switches 250-252. Any other requesting master modules wait until a new arbitration takes place.

Because the targeted bus slave layer belongs to one of multiple ports of the multiport slave module 120, another arbitration takes place at a multiport slave arbiter 280. The multiport slave arbiter 280 determines a winning master module between concurrent requests from master modules on the bus slave layers 260-262. After the multiport slave arbiter 280 determines a winning master module, a master and a slave module can exchange data. For example, the data exchange can be carried on a physical interface 290 on the multiport slave module 120. The data exchange can be delayed depending on the internal state of the multiport slave module 120.

A scheduler 225 coordinates bus accesses to meet bandwidth and/or latency constraints for the various modules on the system bus matrix 110. The scheduler 225 sends instructions to the system bus arbiters 220-222 to grant adequate bus accesses to the master modules 200-202 to meet the bandwidth and/or latency constraints for the master modules. To meet the bandwidth and/or latency constraints, the scheduler 225 considers the bus slave layers 260-262 as a single layer for counting elapsed accesses at the multiport slave.

Data exchanges can be packed in bursts of specified lengths. For example, a certain number of data words (e.g., 4, 8, 16,, or more) can be transferred before a next arbitration (e.g., by the system bus arbiters 220-222 or the multiport slave arbiter 280) selects a new master layer or multiport slave layer. In some circumstances (e.g., under significant workload), if the multiport slave arbiter 280 selects bus slave layers in a fair style arbitration, the bandwidth and/or latency constraints of the modules may not be satisfied, even with the scheduler 225 attempting to coordinate bus accesses.

Generally, the longer the bursts are on a bus slave layer from an initiating master module, the more slave layer bandwidth the initiating master module will tend to consume. The longer the bursts are at the physical interface 290 of the multiport slave module 120, the more multiport slave bandwidth the initiating master module will tend to consume. The more frequently that a master module initiates bus accesses, the more bandwidth it will tend to consume.

Consider an example scenario where a first master module 200 accesses the multiport slave module 120 for a long burst. During the long burst, a second master module 201 attempts to access the multiport slave module 120. The scheduler 225 determines that the second master module 201 is a critical master module, e.g., so that delaying the second master module's access will result in some system failure. The scheduler 225 determines that the first master module 200 is not critical and generally has its bandwidth and latency requirements met. The scheduler 225 can break the burst for the first master module 220 to allow the second master module 201 to access the multiport slave module 120. The burst for the first master module 220 can then be resumed later.

Breaking the burst allows both master modules 200 and 201 to meet their bandwidth and latency requirements; however, the multiport slave module 120 can be disturbed by such a burst break. For example, the multiport slave module 120 can require several system bus clock cycles for certain actions, e.g., to cancel commands, end bursts that have already started at the physical interface 290, or to start new bursts. Burst breaks can also result in failing, at the multiport slave module 120 physical interface 290, to concurrently execute a current data burst and a command for a next data burst. For example, where the multiport slave module 120 is a pipelined multiport memory module, the pipelining of memory requests can be disturbed as described above.

The scheduler 225 provides scheduling information to the multiport slave arbiter 280. The scheduling information is useful, e.g., to alleviate the disturbances that can result from burst breaks. The scheduler 225 can provide the scheduling information to the multiport slave arbiter 280 using additional communication channels 270-272. There can be one additional communication channel for each of the bus slave layers 260-262. The multiport slave arbiter 280 uses the scheduling information in arbitrating between the bus slave layers 260-262.

The scheduling information can include master categorization information and anticipated burst information. The anticipated burst information can indicate, e.g., a required burst break for the current burst on a bus slave layer, or a required burst recovery of a previously broken burst on a bus slave layer. The master categorization information categorizes master modules based on, e.g., bandwidth and/or latency requirements. The master categorization information can be static or dynamic. The master categorization information can categorize a particular master module (and thus every bus access by that master) or a particular bus access made by a master module. Examples of scheduling information are described below in reference to Tables 1, and 2.

Table 1, shows example categories for master categorization information and corresponding example symbols and values. The categories are labeled "next burst master criticality class" (NMCC). In general, the categories indicate a level of criticality to system operation for a master module (or a specific bus access by a master module).

TABLE 1

| Next Burst Master Criticality Class | NMCC Symbol | Binary Coding |
| --- | --- | --- |
| Latency critical | LC | 111 |
| Bandwidth critical | BC | 110 |
| Latency sensitive, self-limited throughput | LSL | 101 |
| Latency sensitive, unlimited throughput | LSU | 100 |
| Bandwidth sensitive, self-limited throughput | BSL | 011 |
| Bandwidth sensitive, unlimited throughput | BSU | 010 |
| Not sensitive, self-limited throughput | NSL | 001 |
| Not sensitive, unlimited throughput | NSU | 000 |

The NMCC categories shown need not be associated with any particular priority level. In some implementations, an implied native priority can correspond between the class pairs. The scheduler 225 and the multiport slave arbiter 280 can be programmed to respond in a consistent way to the different NMCC categories. For example, the scheduler 225 and the multiport slave arbiter 280 can have the same priority ordering of NMCC categories (e.g., so that master modules with higher priority can cause a burst break for bursts of master modules with lower priorities.)

A latency critical master module can be a master module that requires accessing the multiport slave module 120 in a specified amount of time, e.g., a time potentially shorter than the longest turnaround time for the scheduler 225 to complete a full arbitration round of only the bandwidth critical master modules. If a latency critical master module cannot access the multiport slave module 120 within the specified amount of time, an application or system failure results. Systems can include latency critical masters, for example, where real time high responsiveness is required through external interfaces.

A bandwidth critical master module can be a master module that requires a minimum average data bandwidth through certain ports on the multiport slave module 120. The bandwidth can be specified over an arbitrary period of time which can depend on the scheduler 225 programming so that the scheduler 225 can perform actions to fulfill the requirement. If a bandwidth critical master cannot get its minimum bandwidth, an application or system failure results. For example, in some applications, the display controller 103 of FIG. 1 can belong to this category.

A latency sensitive master module can be a master module for which performance decreases as the average access time to the multiport slave module 120 increases. For example, in some applications, the microprocessor core 101 of FIG. 1 can belong to this category.

A bandwidth sensitive master module can be a master module for which performance decreases as the average bandwidth through a port of the multiport slave module 120 decreases. For example, the high-speed peripheral bus master 104 of FIG. 1 can belong to this category.

A master module not sensitive to data flow timings can be a master module that shows no external visible impact to a user. In general, the scheduler 225 and multiport slave arbiter 280 are configured to break bursts from not-sensitive master modules in favor of bursts from master modules that are timing sensitive.

Master modules can also be distinguished in terms of flow control. Self-limited throughput master modules have an intrinsically limited system bus request rate. For example, a master module linked to an external transceiver can be limited by its baudrate. Unlimited throughput master modules are only system limited and can potentially saturate the system bus matrix 110 and multiport slave arbiter 280 with requests. So there is a lower probability when granting access to a self-limited master module that there will soon be a new request. Depending on performance goals, the scheduler 225 and multiport slave arbiter 280 can grant access to self-limited masters first or last when sorting master module requests.

In operation, the scheduler 225 can provide updated master categorization information to the multiport slave arbiter 280 to reflect the master categorization of a next burst master request. The scheduler 225 can provide the updated master categorization information for the next burst following assertion of address and control information for a current burst. The scheduler 225 can provide updated master categorization information for the next burst at any time during the current burst, for example, according to a new scheduled arbitration by the scheduler 225 as new requests from master modules are evaluated.

Table 2, shows example categories for anticipated burst information and corresponding example symbols and values. The categories are labeled "next master burst request" (NMBR). In general, the scheduler 225 sends the anticipated next burst information to notify the multiport slave module 120 about an upcoming master module and burst relative to a current or past master module and burst. The categories indicate when to initiate a burst break or when to initiate a burst recovery of a broken burst. Anticipated burst information can be sent concurrently and with the same clock timing as the master categorization information.

TABLE 2

| Next Master Burst Request | NMBR Symbol | Binary Coding |
|---|---|---|
| Burst recovery or Same master | MR/SM | 11 |
| Burst break | MB | 10 |

TABLE 2-continued

| Next Master Burst Request | NMBR Symbol | Binary Coding |
|---|---|---|
| Other master | OM | 01 |
| No pending request | NM | 00 |

The scheduler 225 sends "no pending request" to indicate that the scheduler has not determined that there will be a master module attempting to request access to the given bus slave layer after the current access. In some implementations of the multiport slave module 120, the multiport slave module can determine to grant access to other ports after receiving a "no pending request" value for a particular port.

The scheduler 225 can also include a next master identification tag with the anticipated burst information. The next master identification tag identifies the forecasted master for the next burst. The next master identification tag can be a differential identification tag. A differential identification tag indicates whether the next anticipated master module is the same or different than the current master module. The differential identification tag can indicate whether the anticipated master module is different from the current master module, whether the anticipated master module has a different categorization than the current master module, or whether a particular burst of the anticipated master module has a different categorization than the current burst.

The scheduler 225 sends "Other master" to indicate that, at the next burst on the given bus slave layer, a different master module will request the given bus slave layer. The different master module has the criticality indicated by the master categorization information. This is an example of a differential identification tag, because the "Other master" message refers to a change in master modules from a current burst to a next burst.

The scheduler 225 sends "Burst break" to indicate that the scheduler requires the current burst to be broken to insert the next requesting master burst as soon as possible.

The scheduler 225 sends "Burst recovery or Same master" to indicate that, at the next burst on the given bus slave layer, the master module that will access the layer has the criticality indicated by the master categorization information, and that master module will be the last burst broken master module with that criticality, if any, or the current or last master module to access the bus slave layer with that criticality. In some implementations, the scheduler 225 uses different binary codings for "Burst recovery" and "Same master," e.g., where the scheduler 225 does not recover from a broken burst of some criticality prior to initiating a new breakable burst of the same criticality.

If the scheduler 225 asserts "Burst recovery or Same master" after at least one burst break has occurred and no lower criticality burst than the current burst has initiated after the burst break, then the scheduler 225 will plan to resume the broken burst at the end of the current burst. Otherwise, the multiport slave module 120 determines whether to select the master based on its internal optimization constraints and the master categorization information.

The scheduler 225 is most likely to break bursts when the scheduler 225 struggles to meet the master data flow timing requirements, for example, when a bus slave layer is busy with background long bursts and a particular master module has a high enough bandwidth requirement that can no longer be satisfied by only inserting its bursts between other master module bursts. For example, this can happen where arbitration of the bus slave layer is pipelined so that consecutive bursts from the same master module result in non-consecutive bursts on the bus slave layer due to the lack of arbiter visibility on the next burst from the same master module.

By sending scheduling information from the scheduler 225 to the multiport slave module 120, the scheduler 225 and the multiport slave module 120 can purposefully break bursts to increase the available bandwidth on a bus slave layer. For example, where the multiport slave module 120 has a high access latency (e.g., due to pipelining), the available bandwidth on a bus slave layer can be increased by performing latency hiding by interleaving bursts by pairs, which is described in more detail with reference to FIG. 5 and FIG. 6.

The multiport slave module 120, after receiving the scheduling information, has available information about upcoming scheduler determinations and the criticality of upcoming bursts. By using that information and the currently pending requests, during arbitration, the multiport slave module 120 can act in concert with the scheduler 225 to determine the order in which to grant access from its ports and efficiently allow burst breaks when required by the scheduler 225.

Some commands or bursts cannot be interrupted once initiated at the multiport slave physical interface 290. The multiport slave module 120 can send information to indicate to the scheduler 225 when the bus slave layer current burst can be broken with no or minimal impact. The multiport slave module 120 can send information to indicate, after a burst has been broken, when a next master burst recovery request is committed for the corresponding command to be launched at the multiport slave physical interface 290. For example, the multiport slave module 120 can send both of these two types of information by asserting a next master broken burst acknowledge (NMBA) message to the scheduler 225 for a particular bus slave layer.

In some implementations, the multiport slave module 120 can send the NMBA message to the scheduler 225 at every appropriate time slot even if no next master burst break request has previously been made. In some other implementations, the multiport slave module 120 sends the NMBA message to the scheduler only after receiving a next master burst break request.

The multiport slave arbiter 280 can break the current master burst to initiate a higher priority master burst after receiving the next master burst break request and sending a next master broken burst acknowledge. In some implementations, the multiport slave arbiter 280 only breaks bursts after the NMBA has been sent. When the multiport slave module 120 has committed to initiating a burst recovery by sending a next master broken burst acknowledge response to next master burst recovery request, the multiport slave module 120 initiates the recovery command on the multiport slave physical interface 290 and the scheduler 225 instructs the multiport slave arbiter 280 to recover the broken burst after the end of the current burst on the bus slave layer.

Scheduling Information Flow

Figure 3:
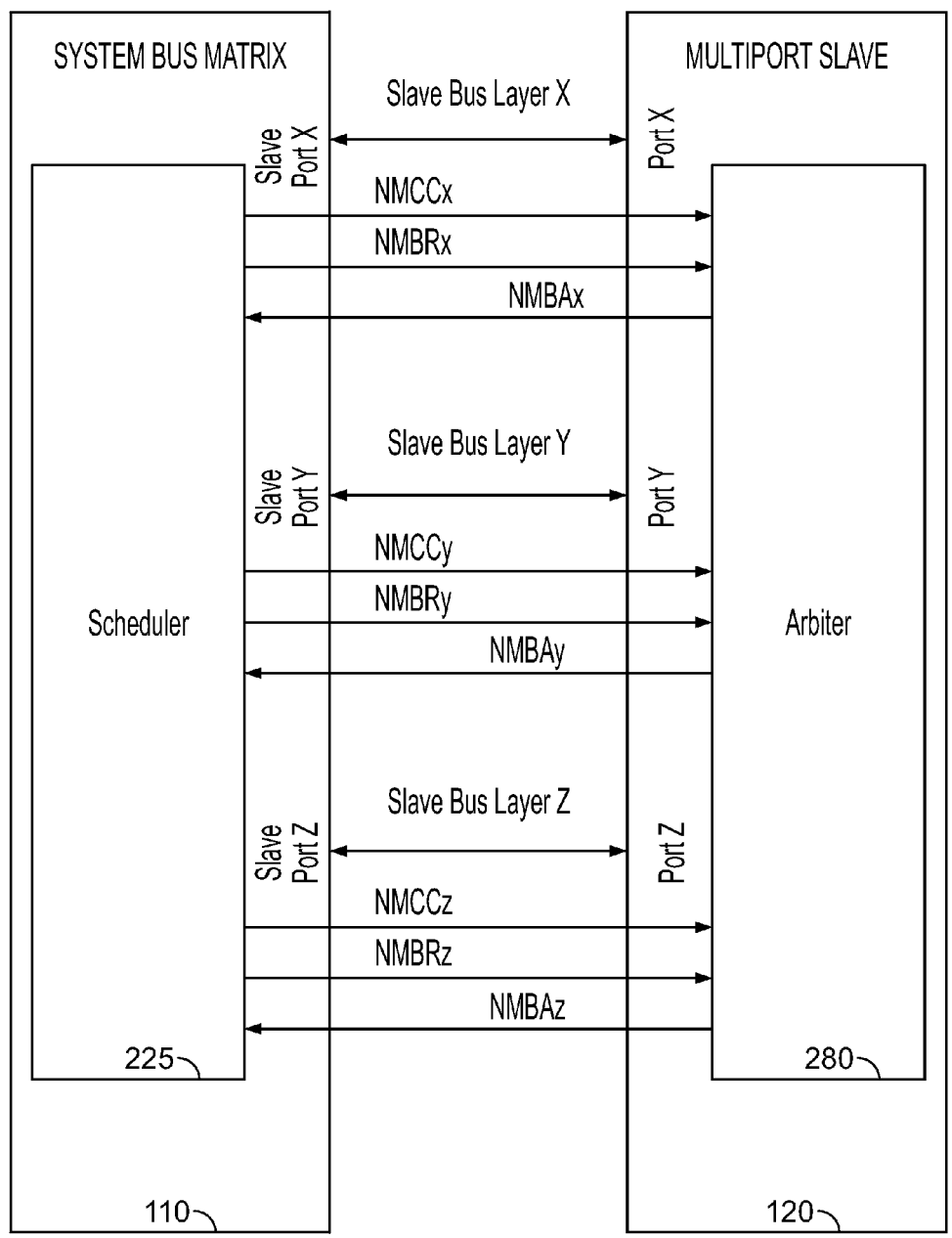
FIG. 3 is a schematic diagram illustrating the flow of scheduling information between a scheduler and a multiport slave module.

FIG. 3 is a schematic diagram illustrating the flow of scheduling information between a scheduler 225 and a multiport slave module 120. NMCCx is the next master criticality class to port x of the multiport slave. NMBRx is the next master burst request to port x of the multiport slave. NMBAx is the next master broken burst acknowledge from port x of the multiport slave. NMCCy is the next master criticality class to port y of the multiport slave. NMBRy is the next master burst request to port y of the multiport slave. NMBAy is the next master broken burst acknowledge from port y of the multiport slave. NMCCz is the next master criticality class to port z of the multiport slave. NMBRz is the next master burst request to port z of the multiport slave. NMBAz is the next master broken burst acknowledge from port z of the multiport slave.

Example Timing Diagrams

Figure 4:
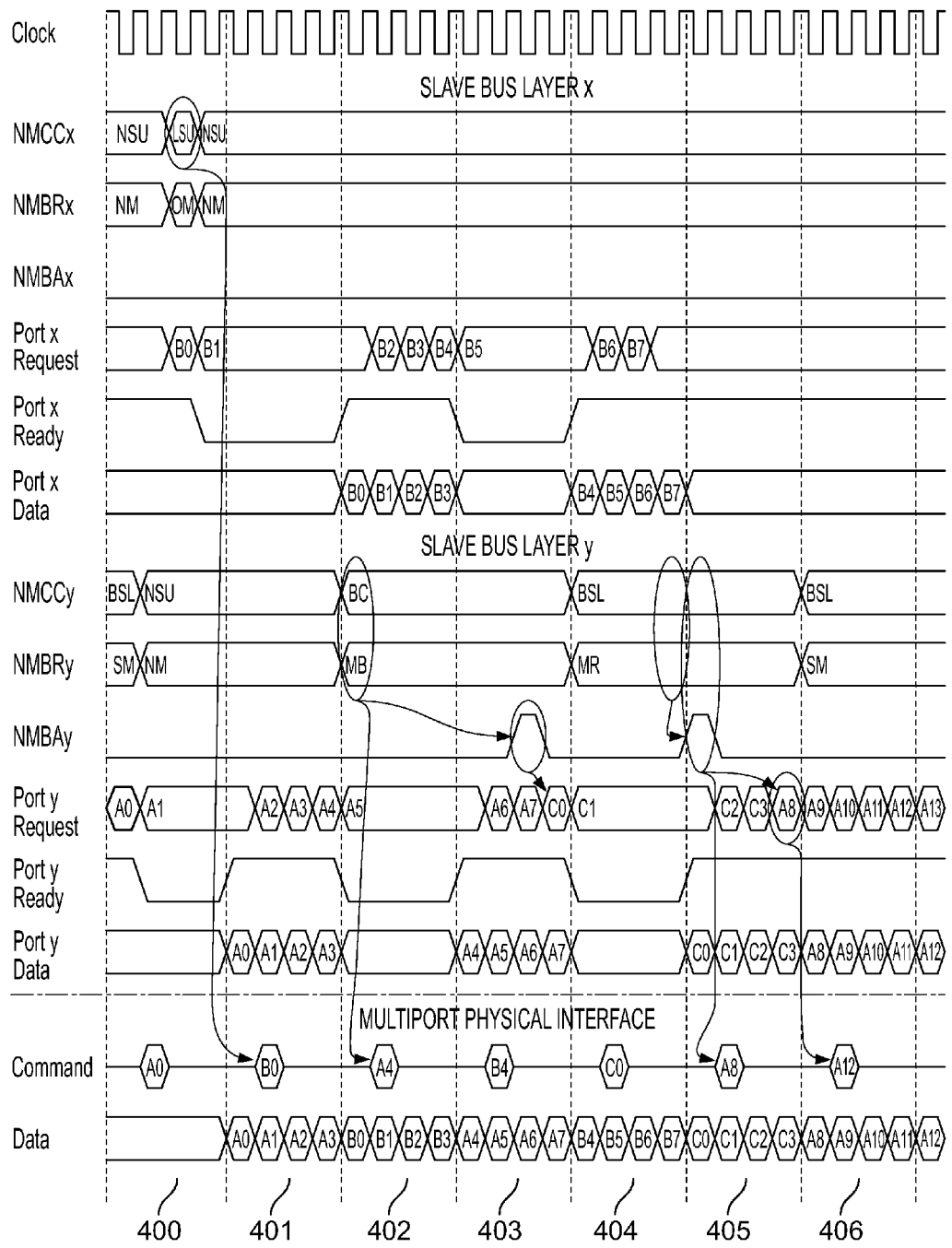
FIGS. 4-6 are timing diagrams of example scenarios that illustrate communication of scheduling information between a system bus scheduler and a multiport slave module.
Figure 5:
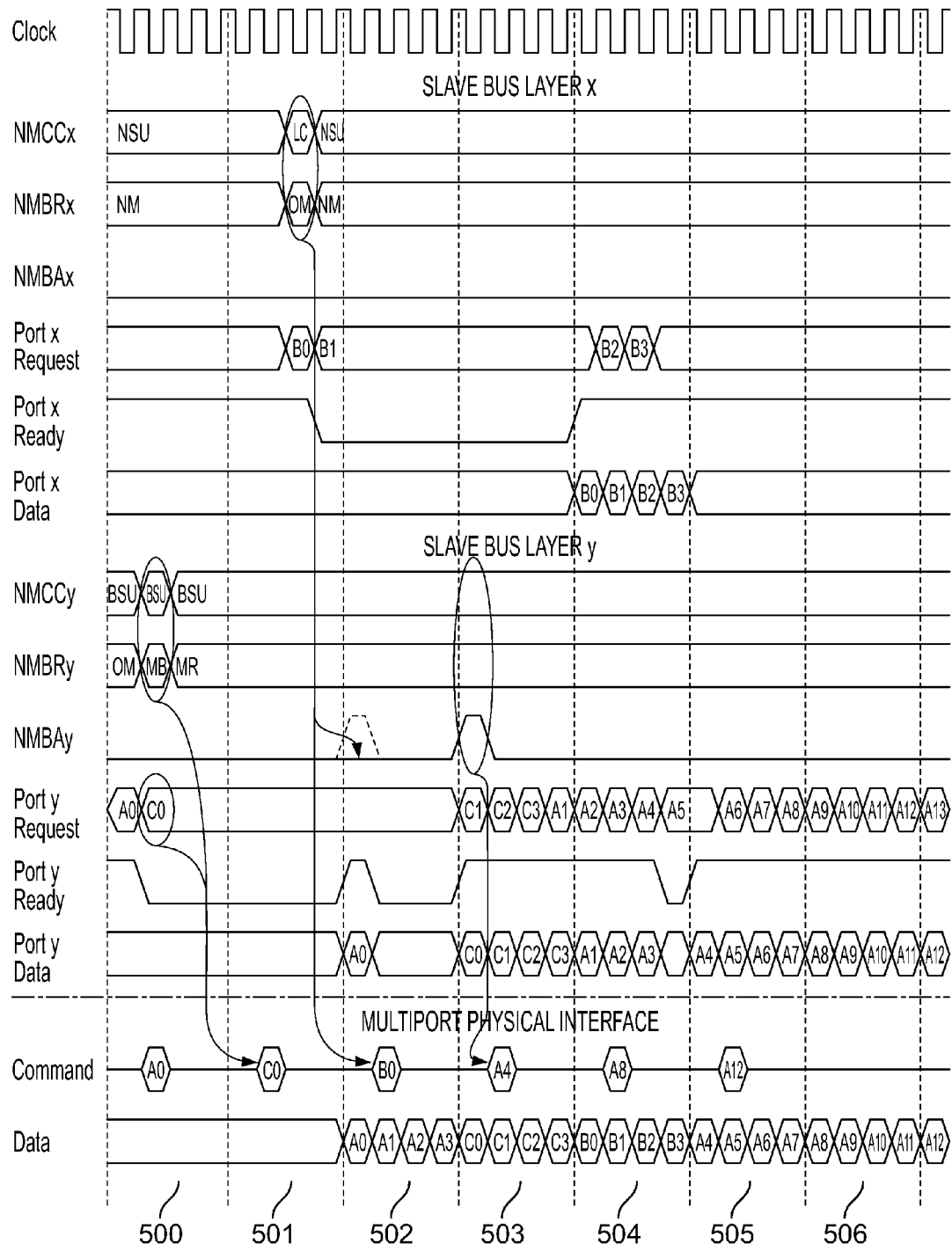
Figure 6:
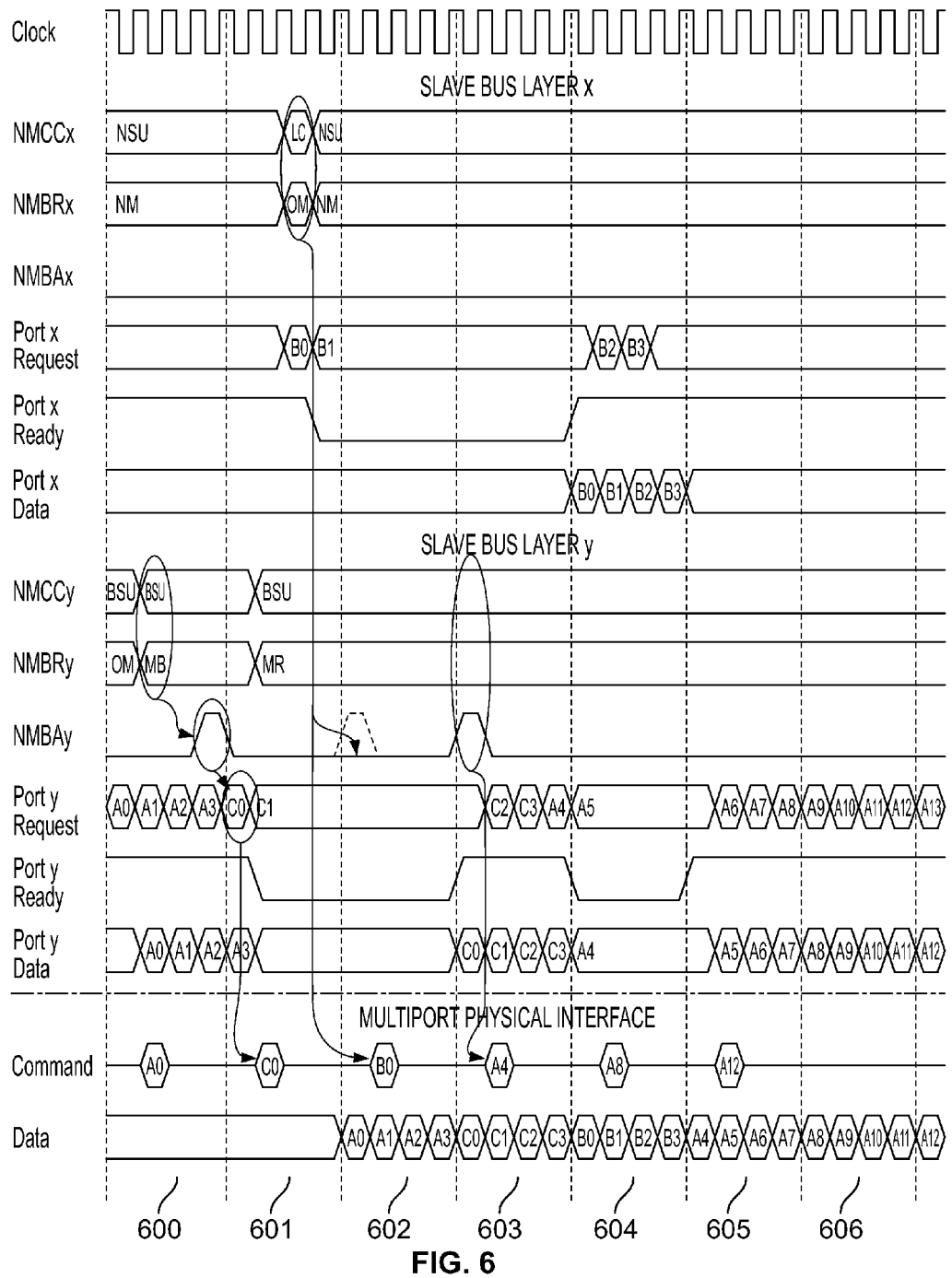

FIGS. 4-6 are timing diagrams of example scenarios that illustrate communication of scheduling information between a system bus scheduler (e.g., the scheduler 225 of FIG. 2) and a multiport slave module (e.g., the multiport slave module 120 of FIG. 2.)

The timing diagrams show a clock signal, signals for a first slave bus layer x, signals for a second slave bus layer y, and a multiport physical interface. Requests for access from master modules are shown as Port x Request and Port y Request. Those requests can include address and control information for the x and y slave bus layers. The length of each requested burst is encoded, e.g., in the first clock cycle of the request for access.

The accesses illustrated are pipelined so that the address and control information of a burst number n+1, appearing on Port x Request or Port y Request is taken into account at the same clock cycle that the respective data appears on Port x Data or Port y Data of a burst number n upon assertion of the corresponding respective Port x Ready signal or Port y Ready signal by the multiport slave. Port x Data and Port y Data are bidirectional data buses.

NMCCx and NMCCy are the next burst master criticality class signals. NMBRx and NMBRy are the next master burst request signals. NMBAx and NMBAy are the next master broken burst acknowledge signals.

The example multiport slave module in these timing diagrams has a single channel physical interface, so it performs a data transfer for a single address in one clock cycle. The multiport slave module initiates a four beat burst transfer on the physical interface by asserting a single command on the physical interface Command bus. The burst transfer then begins a few clock cycles after the command has been asserted.

The requests and accesses of three competing master modules A, B, and C are shown. The progress of a given access at the multiport slave module is indicated by a unique label formed with a first letter identifying the requesting master module A, B or C followed by a transfer number for the burst that indicates a particular beat of the burst. For example, B4 stands for the fourth beat of a burst from master module B.

For purposes of illustration, the timelines of the diagrams have been divided into time slices corresponding to data bursts at the multiport slave physical interface. These time slices are labeled 400 to 406 in FIGS. 4, 500 to 506 in FIGS. 5, and 600 to 606 in FIG. 6.

Example Timing Diagram—No Internal Buffering

FIG. 4 is a timing diagram of an example scenario of arbitration and data flow with a monochannel multiport slave module that does not use internal data buffering. The example illustrates a non-authoritative burst break and recovery.

Because the multiport slave module does not use internal data buffering in this example scenario, each transfer at the physical interface Data bus is simultaneously and combinatorially done within a unique clock cycle through the Port x Data or Port y Data depending on which port is granted access by the multiport slave arbiter. The access latency at the physical interface between receiving a command on the Command bus and the corresponding first burst beat data on the Data bus is less than the duration of the burst. The direction of the transfer can be from the slave to the master or from the master to the slave.

During time slice 400, master module A makes a request A0 on Port y Request. While that request is pending, a new request B0 arrives from master module B through Port x Request. The B0 request from master module B has been immediately forwarded by the system bus scheduler to slave port x, and therefore no anticipation of the request is available on the NMBRx and NMCCx signals before the assertion of the B0 request on Port x Request. The NMCCx value of LSU indicates that the request is coming from a Latency Sensitive Unlimited throughput master and the NMBRx value OM indicates that this master module, B, is not the same as the previous master module that performed an access with an LSU criticality.

Master module A has a criticality of BSL, Bandwidth Sensitive Limited throughput, as shown on the NMCCy input during the first clock cycle of time slice 400. In this example scenario, the system considers BSL to have a lower priority than LSU. So the multiport slave arbiter can grant master module B access as soon as possible, that is, at the next available command slot which occurs during time slice 401 where B0 is shown on the Command bus and the physical interface A0-A4 data burst is transferring. The Port x Ready and Port y Ready are asserted high each time a valid data beat of a burst is transferred on the respective x and y ports.

At the beginning of time slice 402 the system bus receives another master module request from a Bandwidth Critical master module as indicated by the BC value on the NMCCy multiport slave input. The request is scheduled to the next access on the y port. To help meet the bandwidth constraints for master module C (which can be programmed into the system bus scheduler), the system scheduler determines that the current long burst from master module A on the y port should be broken to let master module C insert its burst as soon as possible.

In this example scenario, the Bandwidth Critical master module C is considered to have a higher priority than the current Latency Sensitive master module B. Thus, at the beginning of time slice 402, the multiport slave arbiter determines to favor the draining of the y port despite its low criticality (the BSL master module A). The multiport slave arbiter favors the draining of the y port to more quickly allow the foreseen Bandwidth Critical master module C to break the current burst. Since the A4 request on Port y Request had already been committed for a transfer, a command is launched for a four beat data burst on the Command bus of the physical interface.

At time slice 403, the data transfers for the A4-A7 burst beats are performed. As the address phase for the A7 burst beat is entered the multiport slave arbiter asserts the next master broken burst acknowledge NMBAy output to indicate that the system bus scheduler should break the current master module A burst at the following bus cycle. During the ending clock cycle of time slice 403, the system bus scheduler enables the driving of the first address and control data, C0, of master module C's requested burst on the Port y Request.

Due to access latency at the physical interface, there were no more possibly transferred data burst beats on the y port after the A7 data beat and until the C0 data beat, so access is granted to the waiting master module B on port x during time slice 404. Once the C0 request has been sampled on Port y Request at the end of time slice 403, the NMCCy and NMBRy signals are updated by the system bus scheduler with the next determined burst flow request, while the C0 command is prepared for launching on the physical interface Command bus.

At the end of time slice 404, the multiport slave arbiter determines a next command to launch on the physical interface. As there is a No Pending request value (NM) on the next master burst request on the x port and no more commands to launch for any currently running requests on the x port, the multiport arbiter determines to grant the y port access for the next time slice.

So at the beginning of time slice 405, as the current burst for master module C does not need any more commands launched on the physical interface and the NMCCy and NMBRy indicate a next burst recovery, the multiport slave module asserts the next master broken burst acknowledge output. This commits both the system bus scheduler and the multiport slave arbiter for the burst recovery. The multiport slave module determines the state of the master module A broken burst to determine where to reinitiate the burst. The multiport slave module launches the A8 command on the physical interface Command bus. The system bus scheduler then recovers the broken master module A burst immediately after the end of the current master module C burst.

At the end of time slice 405 the burst recovery is confirmed by the A8 request appearing on the Port y Request input so that the next command A12 for the master module A burst can be launched at the physical interface during time slice 406. Immediately after the A8 request, the next master burst request NMBRy and next burst master criticality NMCCy are updated to reflect the next foreseen burst characteristics (in this example, the same master module A.)

Example Timing Diagram—Internal Buffering and Read Burst Interleaving

FIG. 5 is a timing diagram of an example scenario of arbitration and data flow sequence with a monochannel multiport slave module that uses internal read data buffering. The example illustrates a non-authoritative burst break and recovery.

Because the multiport slave module uses internal read data buffering, transfers at the physical interface Data bus in some cases will not simultaneously and combinatorially be done with the same clock cycle through the Port x Data or Port y Data, but will be delayed until the multiport slave arbiter grants access to the appropriate port. The access latency at the physical interface between a command launch on the Command bus and the corresponding first burst beat data on the Data bus is greater than the duration of the burst. The master module A performs a long read burst; the other accesses can be read accesses or write accesses.

When two or more master modules have each a pending request for a new burst at the multiport slave arbiter, the system scheduler starts interleaving the bursts from distinct master modules by pairs to help reduce the average access latency seen at the corresponding slave ports. This is useful, for example, where interleaving the bursts does not incur an access time penalty. For example, with a multiport memory controller, the two master modules can be programmed to use distinct memory banks.

During time slice 500, master module A makes a first request A0 on Port y Request which is acknowledged by the multiport slave module by asserting the Port y Ready output. That first request is followed on the same port by a new request C0 from master module C. The later C0 request will remain pending at the slave y port until the former A0 request enters the data phase. One clock cycle after each of the first two request have been received together with their associated NMBRy and NMCCy values, the scheduler updates the next burst master criticality class and next master burst request to reflect the next incoming burst characteristics.

The system scheduler has thus performed an authoritative burst break of the A0 request in favor of the C0 request. The system scheduler did not wait for the multiport slave module to assert the NMBAy output. The system scheduler already requires the broken burst to be resumed, as indicated by the MR value driven on the next master burst request NMBRy input indicating a next burst recovery request value, given that a same BSU criticality burst has been broken earlier.

At the beginning of time slice 501, the multiport slave module prepares a command to launch on the physical interface during time slice 502 for a transfer during time slice 503. As no other higher priority request is running or predicted by the next master burst request and next burst master criticality class inputs, the C0 request is transmitted to the Command bus. Thus, the Command to Data latency time for the C0-C3 burst overlaps the latency time of the A0-A3 burst during time slices 501 and 502, although both were issued through the same port, port y. Also during time slice 501, a new request from master module B is received for port x, and the request is latency critical.

During time slice 502, the burst data A0 is transferred to the master module A through Port y Data and the remaining A1 to A3 data beats are buffered for later transfer. If the latency critical request from master module B had not been received, the multiport slave would assert the NMBAy signal as indicated by the dashed pulse. However, the acknowledgment of the master module A next burst recovery request MR is postponed due to the latency critical request from master module B. Thus, the B0 request is transmitted to the command bus.

At the beginning of time slice 503, the next burst recovery for master module A is successfully committed between the system scheduler and the multiport slave arbiter by the assertion of the NMBAy pulse acknowledging the MR value on NMBRy. Then the multiport slave internal state of the master module A burst is retrieved and the command for the following unread data from the A4 burst beat is placed on the Command bus.

During time slice 504, the master module C burst finishes being transferred on the Data bus. The previously buffered data A1-A3 can be read through Port y Data while master module B burst data B0-B3 are transferred through the Port x Data. The Port y Data transfer is waited one clock cycle at the end of time slice 504 because the insertion of the master module B burst delayed the master module A burst from resuming at the physical interface. Burst interleaving with a master module A write burst instead of the master module A read burst illustrated in FIG. 5 can, but need not, make use of a similar authoritative burst break.

Example Timing Diagram—Internal Buffering and Write Burst Interleaving

FIG. 6 is a timing diagram of an example scenario of arbitration and data flow sequence with a monochannel multiport slave module that uses internal write data buffering. The example is similar to that shown in FIG. 5 except that the master module A burst is a write burst and the system scheduler does not make use of an authoritative burst break.

In time slices 600 and 601, four write data beats A0-A3 are buffered into the multiport slave before the master module C breaking burst is granted access on the Port y Request bus by a next master broken burst acknowledge NMBAy pulse asserted during the A3 address phase at the end of time slice 600. At the multiport physical interface, the Command to Data latency time for the C0-C3 burst overlaps the latency time of the A0-A3 burst part during time slices 601 and 602, even though both were issued through the same slave port, port y.

Process for Using Scheduling Information

Figure 7:
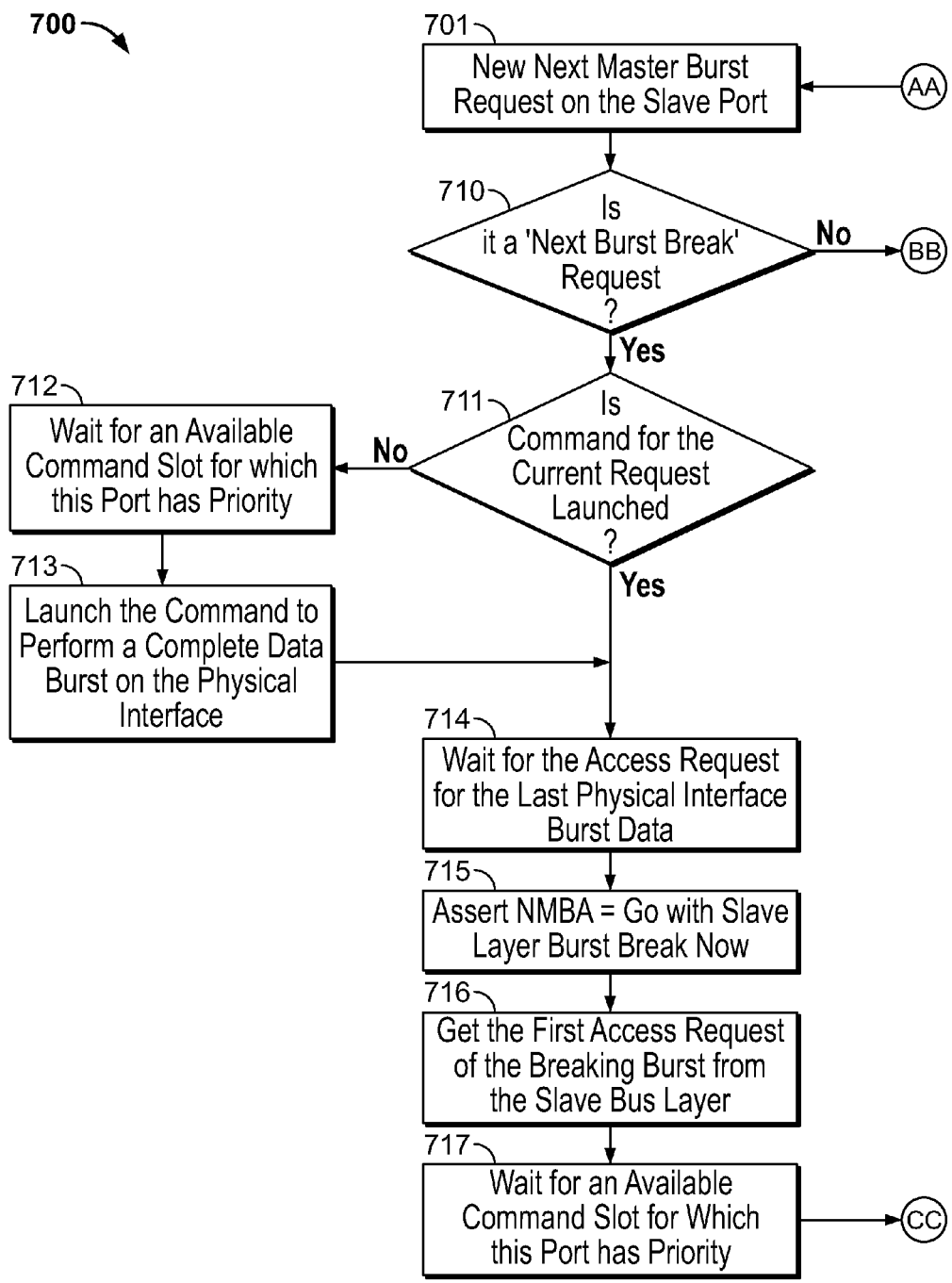
FIG. 7 is a flow diagram of an example process performed by a multiport slave module for using scheduling information.
Figure 7:
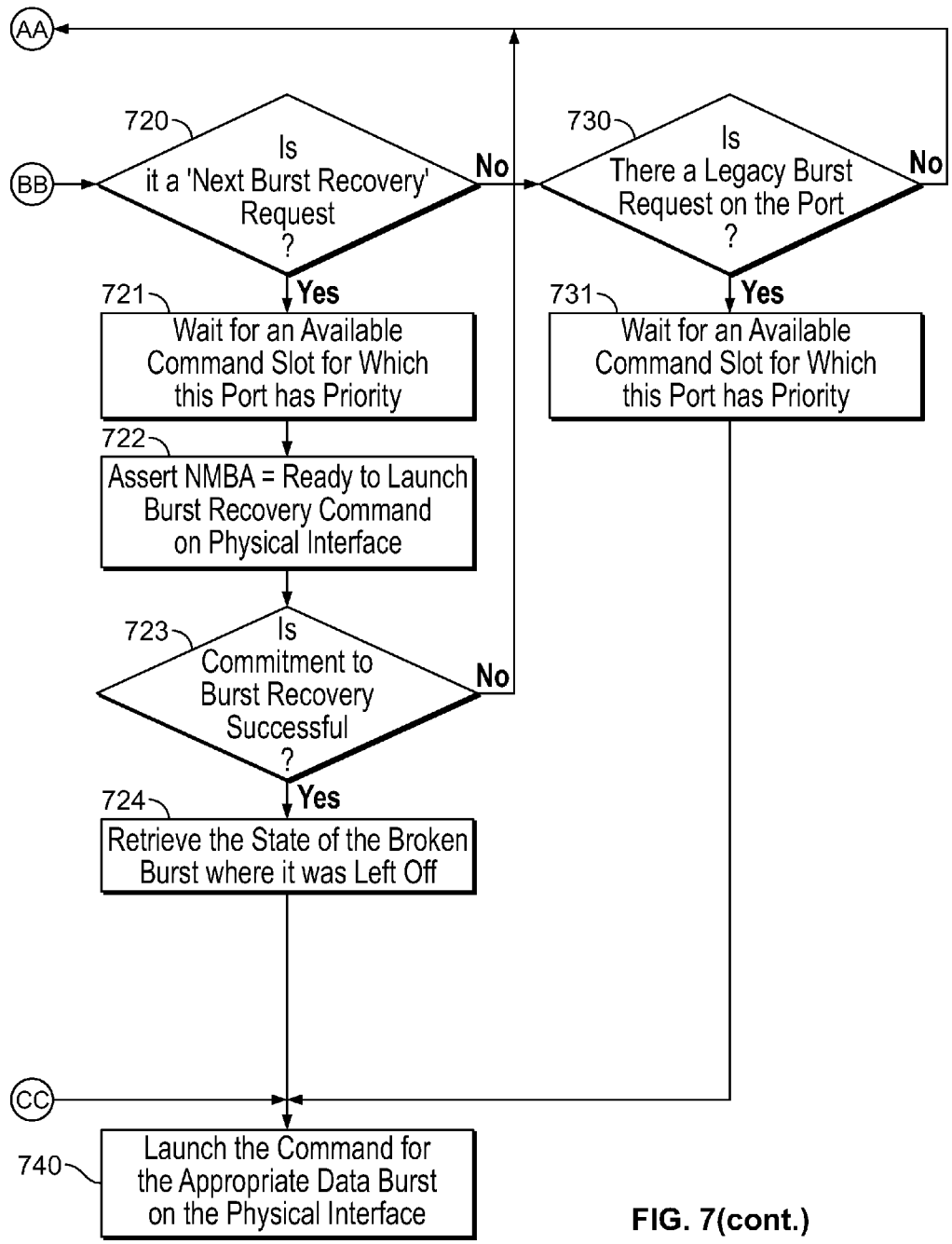

FIG. 7 is a flow diagram of an example process 700 performed by a multiport slave module for using scheduling information. The example process 700 illustrates one way that the multiport slave module can arbitrate between its ports using the scheduling information. The example process 700 is performed by a multiport slave module that does not use data buffering and uses the scheduling information for breaking bursts.

In performing the process 700, a system scheduler and the multiport slave module attempt to meet an optimization goal to meet timing requirements of master modules without losing data cycles or having to cancel commands. Breaking bursts, and therefore being able to size parts of bursts through ports according to the constraints, helps the multiport slave module meet the optimization goal. The example scenario of FIG. 4 illustrates some paths through the process 700. FIG. 4 will be referenced in the discussion of the process 700 to show examples of the steps of the process 700.

At step 701, the multiport slave module receives a new next master burst request on a slave port. The next master burst request does not have the value for No pending request. Steps 710-717 are the steps performed if the next master burst request has a value indicating a next burst break request. Steps 720-724 are the steps performed if the next master burst request has a value indicating a next burst recovery. Steps 730-731 are the steps performed if there is a legacy burst request on the port.

At step 710, the multiport slave module determines whether the next master burst request signal indicates that the scheduler is instructing that the current burst be broken by a burst break value. If so, then at step 711, the multiport slave module determines whether a command for a current access has already been launched—meaning that there is an access already started that needs to be drained. For example, FIG. 4 shows such a pending legacy access request. There, at the end of time slice 401 when A4 on Port y Request has been acknowledged by Port y Ready being asserted on the y port and is waiting for its data phase transfer, the corresponding command as not been launched on the physical interface when the next burst break request occurs. The next burst break request is shown as MB on the NMBRy input at the beginning of time slice 402.

At step 712, the multiport slave module waits for an available command slot for which the port has priority. When the multiport slave arbiter grants the port access to the Command bus, the command can be launched. The multiport slave arbiter determines to grant the port access based on the currently pending legacy request's criticality, which is known from the beginning of the burst at the slave port. For example, in FIG. 4 at the beginning of time slice 400, the BSL value on the NMCCy signal indicates the criticality of that burst.

At step 713, the command is launched on the Command bus of the physical interface. The command is to perform a complete data burst on the physical interface. At step 714, the multiport slave waits for the access request for the last physical interface burst data. The address of the last available data transfer for the burst to be broken is the burst beat after which the break should occur, and the multiport slave waits for the address phase of that burst beat.

At step 715, the multiport slave asserts a next master broken burst acknowledge to enable the burst break. The multiport slave asserts the NMBA as the address phase for the broken burst last beat is reached.

At step 716, the multiport slave receives the first access request of the break burst on the slave bus layer for the port. The system arbiter routes the breaking burst through the slave bus layer for the port and the multiport slave can decode the legacy request signals on the port.

At step 717, the multiport slave waits for an available command slot for which the port has priority. The pending legacy request from the break burst master is waiting to be granted access to the Command bus from the multiport slave arbiter. At step 740, the multiport slave launches a command on the Command bus for the appropriate data burst on the physical interface. The data burst corresponds to the first burst beats of the breaking burst.

Referring back step 710, if the current burst is not being broken, the multiport slave at step 720 determines whether the next master burst request value indicates a next burst recovery request. At step 721, the multiport slave waits for an available command slot for which the port has priority. The port is waiting to be granted a command launch slot on the Command bus from the multiport slave arbiter.

At step 722, the multiport slave asserts the next master broken burst acknowledge, indicating that it is ready to launch the burst recovery command on the physical interface. The multiport slave is attempting to commit both the system scheduler and the multiport slave arbiter for the burst recovery.

At step 723, the multiport slave determines whether the commitment to the burst recovery was successful. The commitment can fail if the next master burst request signal no longer forecasts a next burst recovery, as indicated by the system scheduler, in which case the recovery is cancelled for this time.

At step 724, the multiport slave retrieves the internal state of the previously broken burst, indicating where the broken burst left off. At step 740, the multiport slave launches a command on the Command bus for the appropriate data burst on the physical interface. The data burst corresponds to the burst beats of the burst that is being recovered.

Referring back to step 720, if the next master burst request does not have a value indicating a next burst recovery request, the multiport slave at step 730 determines whether there is a legacy burst request on the port. If no legacy burst request is waiting on the port, then no command is launched at this time.

If a legacy burst request is pending, then the multiport slave at step 731 waits for an available command slot for which the port has priority. The multiport slave arbiter grants the port access to the Command bus. The multiport slave arbiter can determine to grant the port access based on one or more of various factors. For example, the multiport slave arbiter grants access based on the currently pending legacy request's criticality, which is indicated at the beginning of the burst. For example, in FIG. 4, during time slice 400 the NMCCx input has a value of LSU for the B0 command launch at the beginning of time slice 401. In another example, the multiport slave arbiter grants access based on the next master criticality class driven on the NMCC inputs, e.g., the NSU value on the NMCCx input at any examination time at the beginning of a time slice in FIG. 4. In another example, the multiport slave arbiter grants access based on additional intrinsic slave constraints.

The multiport slave module can also take other actions for other kinds of received scheduling information, e.g., as described above in Tables 1 and 2. For example, the multiport slave module can distinguish between different types of next master burst requests such as Same master and Other master.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A system comprising:
a plurality of master modules;
a multiport slave module, the multiport slave module including a plurality of slave ports and a multiport slave arbiter, wherein the multiport slave arbiter is configured to arbitrate between the slave ports;
a system bus connecting the master modules and the multiport slave module; and
a scheduler configured to grant a bus access to a winning master module to transfer a burst of data between the winning master module and the multiport slave module;
wherein the scheduler is configured to provide scheduling information to the multiport slave arbiter, the scheduling information including master categorization information and anticipated burst information, the anticipated burst information being based on a scheduler determination for an anticipated bus access by an anticipated master module to the multiport slave module, the master categorization information categorizing the anticipated master.

2. The system of claim 1, wherein the multiport slave arbiter is configured to receive the scheduling information and use the scheduling information in arbitrating between the slave ports.

3. The system of claim 1, wherein the multiport slave module is a pipelined memory module.

4. The system of claim 1, wherein the master categorization information is based on bandwidth and/or latency requirements of the master modules, and wherein the multiport slave arbiter and the scheduler are configured to prioritize bus accesses using the master categorization information.

5. The system of claim 1, wherein the scheduling information from the scheduler includes an indication of a required break of a current burst.

6. The system of claim 5, wherein the scheduler is configured to break the current burst by suspending the current burst on a current slave port and initiate a new burst on the current slave port.

7. The system of claim 1, wherein the scheduling information from the scheduler includes an indication of a required burst recovery of a previously broken burst on a previous slave port.

8. The system of claim 7, wherein scheduler is configured to recover the previously broken burst on the previous slave port.

9. The system of claim 7, wherein the multiport slave module is configured to send an acknowledgement to the scheduler to commit to recovering the previously broken burst, and wherein the scheduler is configured to grant a recovery bus access to a previous master module for the previously broken burst in response to receiving the acknowledgement.

10. The system of claim 1, wherein the anticipated burst information includes a differential identification tag for the anticipated master module, the differential identification tag indicating whether the anticipated master module is different than a current master module.

11. The method of claim 10, further comprising receiving first and second scheduling information for first and second bursts on first and second slave ports, and interleaving first and second burst transfers on the first and second slave ports.

12. A method performed by a multiport slave module, the method comprising:
receiving, from a scheduler for a system bus connecting the multiport slave module to a plurality of master modules, scheduling information including master categorization information and anticipated burst information, the anticipated burst information being based on a scheduler determination for an anticipated bus access by an anticipated master module to the multiport slave module; and
arbitrating between a plurality of slave ports of the multiport slave module using the scheduling information.

13. The method of claim 12, wherein the master categorization information is based on bandwidth and/or latency requirements of the master modules, and wherein the multiport slave arbiter and the scheduler are configured to prioritize bus accesses using the master categorization information.

14. The method of claim 12, further comprising breaking a first burst transfer on a first port and accepting a second burst transfer from the scheduler on the first port based on the scheduling information from the scheduler.

15. The method of claim 12, further comprising:
accepting a first burst transfer initiated by the scheduler on a first slave port for a first master module having a first master categorization;
receiving from the scheduler an indication of a required burst break and a second master categorization for a second master module;
determining that the second master module has a higher priority than the first master module based on the first and second master categorizations; and
accepting a second burst transfer initiated by the scheduler on the first slave port for the second master module.

16. The method of claim 15, further comprising:
receiving from the scheduler an indication of a burst recovery for the first burst transfer;
sending an acknowledgement to the scheduler for the burst recovery; and
accepting recovery initiated by the scheduler of the first burst transfer on the first slave port.

17. The method of claim 16, wherein accepting the first burst transfer includes buffering first data for the first burst transfer, and wherein accepting recovery of the first burst transfer includes transferring the buffered first data.

18. The method of claim 12, wherein the master categorization information is based on bandwidth and/or latency requirements of the master modules, and wherein the multiport slave arbiter and the scheduler are configured to prioritize bus accesses using the master categorization information.

19. The method of claim 12, wherein the anticipated burst information includes a differential identification tag for the anticipated master module, the differential identification tag indicating whether the anticipated master module is different than a current master module.

20. The method of claim 12, wherein the multiport slave module is a pipelined memory module.

* * * * *

UNITED STATES PATENT AND TRADEMARK OFFICE
CERTIFICATE OF CORRECTION

PATENT NO. : 8,516,167 B2  
APPLICATION NO. : 13/197547  
DATED : August 20, 2013  
INVENTOR(S) : Franck Lunadier Page 1 of 1

It is certified that error appears in the above-identified patent and that said Letters Patent is hereby corrected as shown below:

In the Specification

In Column 3, Line 29 delete "16,," and insert --16,--, therefor.

In Column 4, Line 26 delete "1," and insert --1--, therefor.

In Column 4, line 27 delete "1," and insert --1--, therefor.

In Column 5, line 49 delete "2," and insert --2--, therefor.

In Column 8, line 22 delete "n+1," and insert --n+1--, therefor.

In Column 8, line 51 delete "FIGS." and insert --FIG.--, therefor.

In Column 8, line 51 delete "FIGS." and insert --FIG.--, therefor.

Signed and Sealed this  
Third Day of December, 2013

Margaret A. Focarino  
*Commissioner for Patents of the United States Patent and Trademark Office*